(12) United States Patent
Lawson (10) Patent No.: US 6,339,895 B1
(45) Date of Patent: Jan. 22, 2002

(54) COLLAPSIBLE GAME DECOY (76) Inventor: James Lawson, 1405 Hillside La., Bozeman, MT (US) 59715

( * ) Notice: Subject to any disclaimer, the term of this patent is extended or adjusted under 35 U.S.C. 154(b) by 0 days.

(21) Appl. No.: 09/493,840

(22) Filed: Jan. 28, 2000

Related U.S. Application Data (60) Provisional application No. 60/117,765, filed on Jan. 29, 1999.

(51) Int. Cl.[7] ............................................. A01M 31/06
(52) U.S. Cl. .......................................................... 43/3
(58) Field of Search ........................... 43/2, 3; 446/153, 446/155

(56) References Cited

U.S. PATENT DOCUMENTS

| | | | |
|---|---|---|---|
| 351,709 A | 10/1886 | Nye | 43/3 |
| 836,823 A | * 11/1906 | Oliver et al. | 43/3 |
| 934,342 A | * 9/1909 | Oliver et al. | 43/3 |
| 1,469,188 A | * 9/1923 | Moore | 43/3 |
| 1,673,479 A | * 6/1928 | Allen | 43/3 |
| 1,708,762 A | * 4/1929 | Hudson | 43/3 |
| 1,806,456 A | * 5/1931 | Haigler | 43/3 |
| 1,923,442 A | * 8/1933 | Kilgore | 43/3 |
| 2,201,164 A | * 5/1940 | Fox | 43/3 |
| 2,391,475 A | * 12/1945 | Newhardt | 43/3 |
| 2,495,721 A | * 1/1950 | Heyman | 43/3 |
| 2,523,811 A | * 9/1950 | Buehl | 43/3 |
| 2,564,890 A | 8/1951 | Fox | 43/3 |
| 2,799,961 A | 7/1957 | Jaumotte | 43/3 |
| 2,814,898 A | * 12/1957 | Fluke et al. | 43/3 |
| 2,817,918 A | * 12/1957 | Phillips | 43/3 |
| 2,942,370 A | * 6/1960 | Zaruba | 43/3 |
| 2,984,974 A | * 5/1961 | Bell | 43/3 |
| 3,034,245 A | 5/1962 | Lynch | 43/3 |
| 3,055,134 A | * 9/1962 | Archer | 43/3 |
| 3,254,439 A | 6/1966 | Hansen | 43/3 |
| 3,704,538 A | 12/1972 | Gagnon | 43/3 |
| 4,539,772 A | * 9/1985 | Forbes et al. | 43/3 |
| 4,611,421 A | 9/1986 | Jacob | 43/3 |
| 4,658,530 A | 4/1987 | Ladehoff | 43/3 |
| 4,753,028 A | 6/1988 | Farmer | 43/3 |
| 5,172,507 A | 12/1992 | Franceschini | 43/3 |
| 5,205,060 A | 4/1993 | Franceschini | 43/3 |
| 5,207,757 A | 5/1993 | Franceschini | 43/3 |
| 5,613,317 A | 3/1997 | Ninegar | 43/3 |
| 5,832,650 A | 11/1998 | Franceschini | 43/3 |

* cited by examiner

Primary Examiner—Darren W. Ark
(74) Attorney, Agent, or Firm—Dorsey & Whitney LLP (57) ABSTRACT

A collapsible game decoy permits lifelike appearance during use and easy transportation or storage before or following use. The fully-assembled decoy comprises a decoy body and an air-capture-and-retention system associated with the decoy body. The air-capture-and-retention system releasably clips or snaps onto the decoy body. The resultant fully-assembled decoy is easily inflated through an air port in the air-capture-and-retention system and may be quickly collapsed, for example, manually.

13 Claims, 9 Drawing Sheets

COLLAPSIBLE GAME DECOY

CROSS-REFERENCE TO RELATED APPLICATION

This application claims priority to United States Provisional Application Ser. No. 60/117,765, filed Jan. 29, 1999 (the '765 application). The '765 application is hereby incorporated by reference as though fully set forth herein.

BACKGROUND OF THE INVENTION a. Field of the Invention

The instant invention is directed toward a collapsible game decoy. More specifically, it relates to a game decoy that may be collapsed for easy transportation and then inflated for a more realistic representation of the selected game.

b. Background Art

It is well known for hunters to use game decoys to attract game to a desired location. It is also known for hunters to use decoys that collapse for transportation and then are inflated to create a more realistic impression at a hunting site. A need exists, however, for a collapsible game decoy that is easily assembled, contains few parts, is realistic, and remains inflated, particularly when placed on water. If the decoy is used to attract water fowl by being placed on water, it is also desirable that the decoy not retain water if it overturns and when the user packs the decoys for storage or transportation after use.

BRIEF SUMMARY OF THE INVENTION

It is an object of the disclosed invention to provide an improved collapsible game decoy.

The instant invention is a collapsible game decoy comprising a decoy body and an air-capture-and-retention system. The decoy body has a bottom wall with an opening through it. The air-capture-and-retention system comprises a base and a snap ring that snappingly attached to the decoy body at the opening through the decoy body. An air port passes through the base of the air-capture-and-retention system to permit air to pass into the decoy body after the air-capture-and-retention system is attached thereto. In a preferred form, the base includes a domed top portion and a cylindrical bottom portion, and a circumferential lip divides the domed top portion from the cylindrical bottom portion.

Other aspects, features, and details of the present invention will be apparent from reading the following description and claims, and from reviewing the accompanying drawings.

DESCRIPTION OF THE PREFERRED EMBODIMENTS

As shown to good advantage in FIGS. 1–6, a first preferred embodiment of the fully-assembled decoy 10 of the present invention comprises three primary components: a decoy body 12, a snap ring 14, and a base 16. The snap ring 14 and base 16 together comprise a first preferred embodiment of an air-capture-and-retention system. As shown to good advantage in FIGS. 22–24, a second preferred embodiment of a fully-assembled decoy 10' (FIG. 22) of the present invention also comprises three primary components: the decoy body 12, an alternative snap ring 14', and an alternative base 16'. The alternative snap ring 14' and the alternative base 16' together comprise a second preferred embodiment of the air-capture-and-retention system. In these preferred embodiments, which are described below, each of these three primary components is preferably made by an injection molding process. The decoy body 12 is made from a flexible, air-tight material (e.g., rubber or latex). The snap ring 14, 14' and base 16, 16' are preferably made from a more rigid material (e.g., nylon or plastic).

Figure 1:
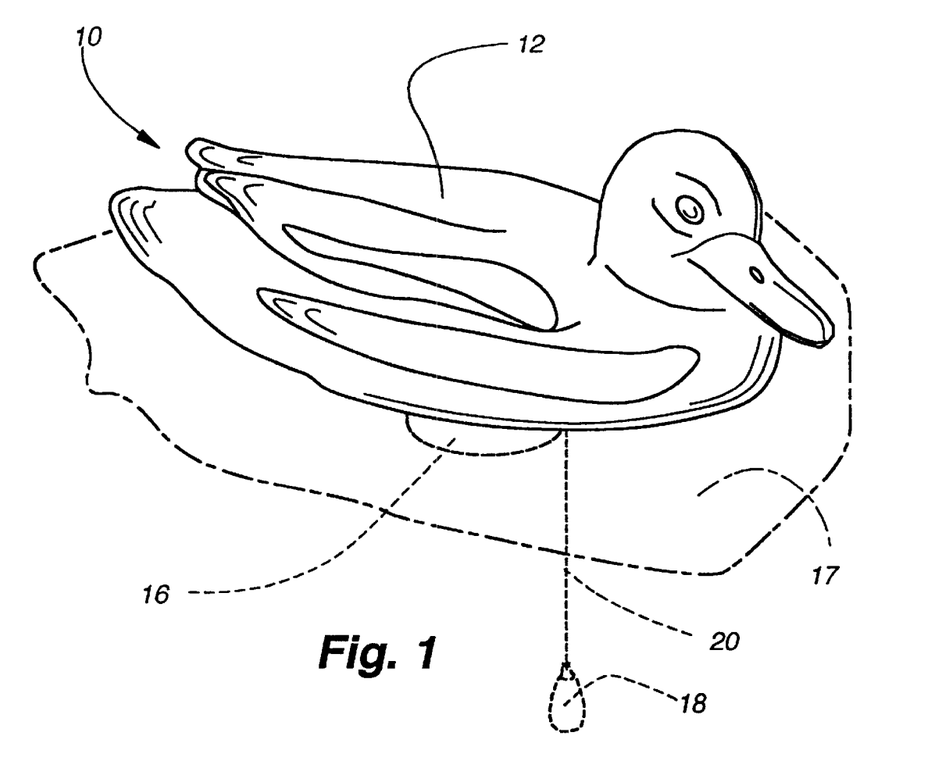
FIG. 1 is an isometric view of a fully-assembled decoy according to the first preferred embodiment of the present invention floating on a body of water.
Figure 3:
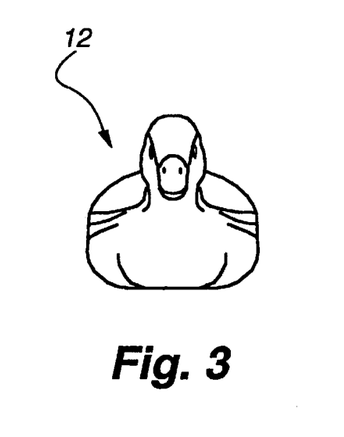
FIG. 3 is a front elevational view of the decoy body shown in FIG. 2.
Figure 4:
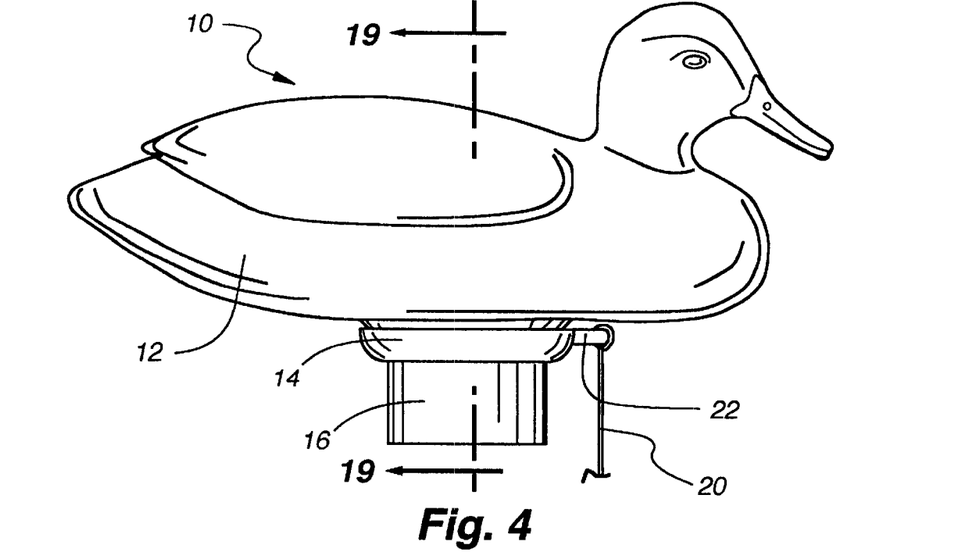
FIG. 4 is an elevational view of the fully-assembled decoy shown in FIG. 1.

Referring to FIGS. 1–21, the first preferred embodiment of the invention will be described. The decoy body 12, which is shown in FIGS. 1–6 as a duck body, is made from a flexible material by an injection molding process. The decoy body 12 could be formed to resemble a particular type of duck or another animal. Alternatively, the decoy body could be painted or dyed after it is formed to better resemble the mimicked animal. As shown in FIG. 1, which depicts a fully-assembled decoy 10 on water 17, a placement weight 18 may be attached to the fully-assembled decoy 10 by a cord 20. FIG. 4 clearly shows how the upper end of the cord 20 could be tied off to a tie-off loop 22 comprising part of the snap ring 14. The placement weight 18 keeps the fully-assembled decoy 10 near a desired location and also helps to stabilize the fully-assembled decoy 10 and maintain its upright position on the surface of the water 17. If the user does not desire to attach a positioning weight 18 to the fully-assembled decoy 10, or if the user decided to attach the positioning weight 18 in another manner, the snap ring 14 could be molded without the tie-off loop 22, or the tie-off loop 22 could be broken off of the snap ring 14. Clearly, the user could also use the snap ring 14 having the tie-off loop 22 without actually tying a positioning weight 18 to the tie-off loop 22.

Figure 2:
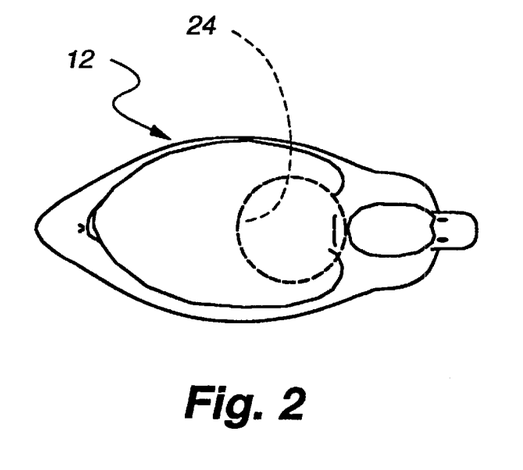
FIG. 2 is a top plan view of the decoy body shown in FIG. 1, but the decoy body is shown detached from the air-capture-and-retention system of the present invention.
Figure 5:
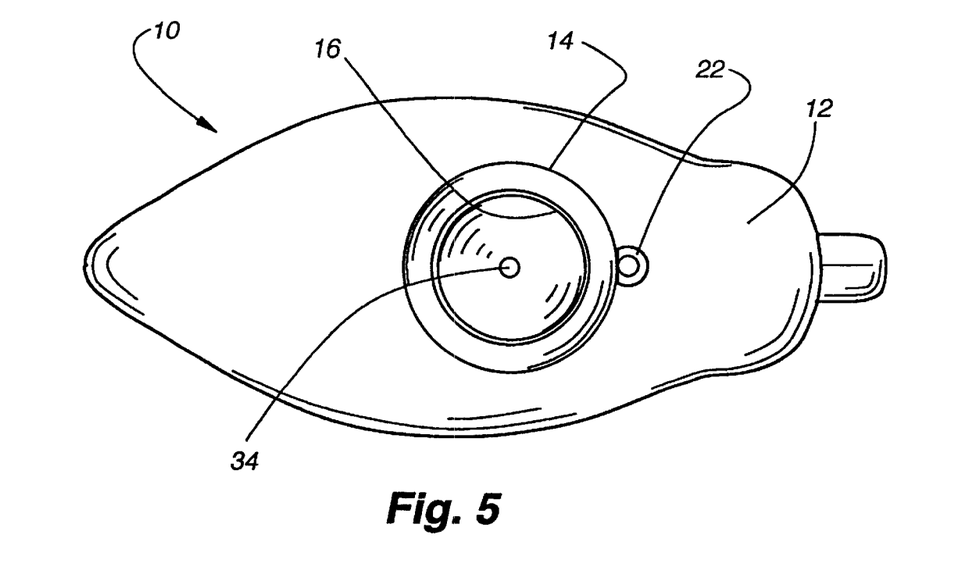
FIG. 5 is a bottom plan view of the fully-assembled decoy shown in FIGS. 1 and 4, but with the placement weight removed.

FIG. 2 is a top plan view of the decoy body 12 and shows in phantom the placement of an opening 24 in the bottom of the decoy body 12. This opening 24 is also shown clearly in FIG. 6, which is a bottom plan view of the decoy body 12. As described further below in connection with FIGS. 17–19, the snap ring 14 and base 16 components of the air-capture-and-retention system of the present invention attach to an edge of this opening 24 in the underside of the decoy body 12. FIG. 3 is a front view of the decoy body 12 detached from the air-capture-and-retention system of the present invention. FIG. 5 is a bottom plan view of the fully-assembled decoy 10 with the placement weight 18 removed.

Figures 6, 7, 8, 9:
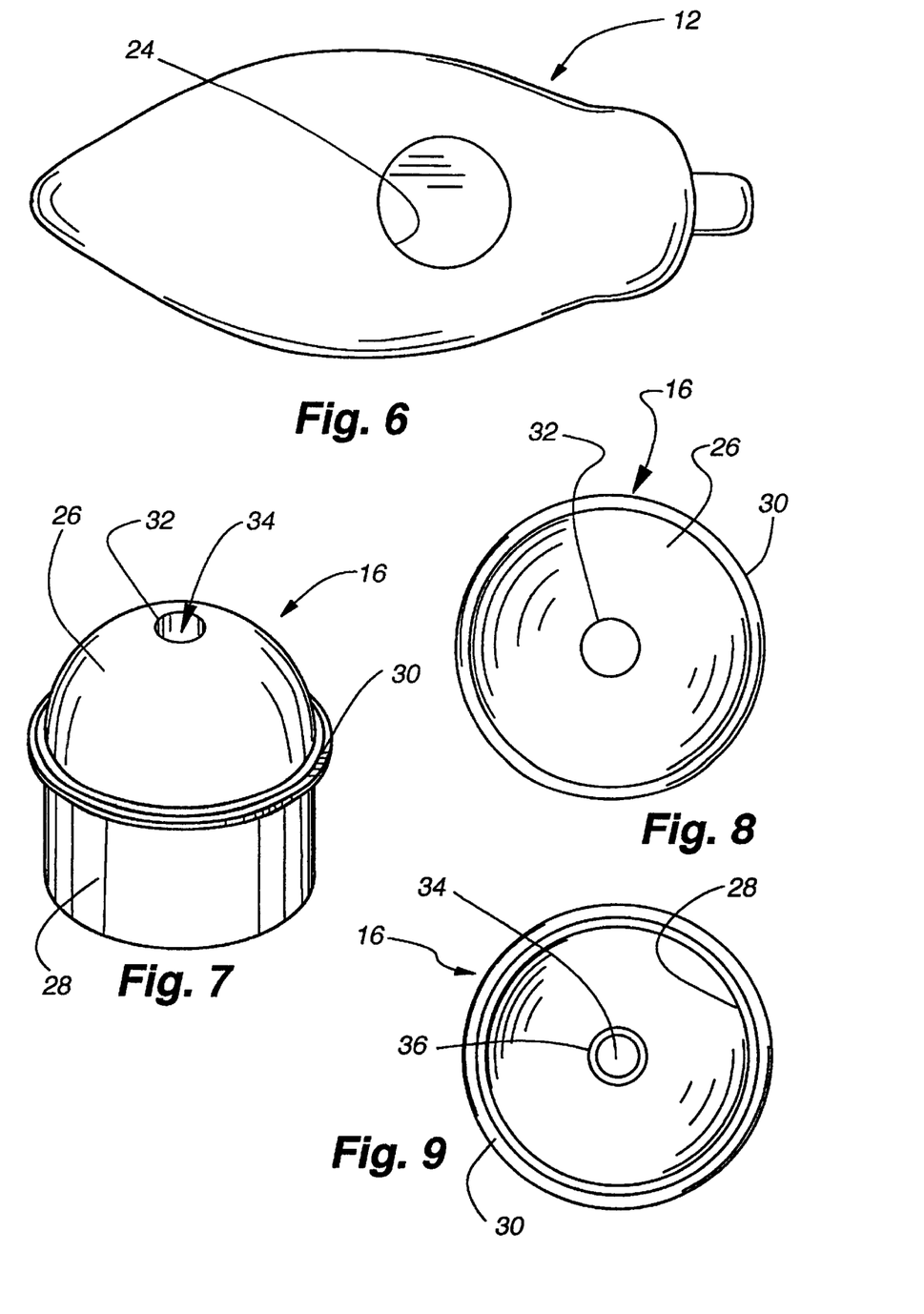
FIG. 6 is a bottom plan view of the decoy body shown in FIGS. 2 and 3.
FIG. 7 is an isometric view depicting a base of the first preferred embodiment of the air-capture-and-retention system of the present invention.
FIG. 8 is a top plan view of the base depicted in FIG. 7.
FIG. 9 is a bottom plan view of the base depicted in FIG. 7.
Figure 10:
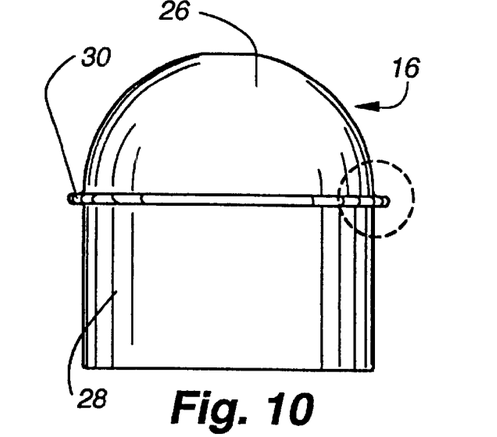
FIG. 10 is an elevational view of the base depicted in FIG. 7.
Figure 11:
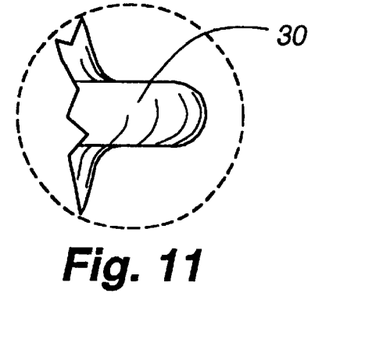
FIG. 11 is an enlarged view of a circumferential lip on the base depicted in FIG. 10.

Referring next to FIGS. 7–11, the base 16 of the air-capture-and-retention system of the first embodiment of the present invention is described next. FIG. 7 is an isometric view looking downwardly on the base 16. As shown in this figure, the base 16 includes a domed top portion 26 and a cylindrical bottom portion 28. A circumferential lip 30 divides the domed top portion 26 from the cylindrical bottom portion 28. A hole 32 is present through the top of the domed top portion 26, leading to a passage or air port 34 comprising a small cylindrical sleeve 36 (see, e.g., FIGS. 9 and 17–21). FIG. 8 is a top plan view of the base 16 depicted in FIG. 7. As clearly depicted in FIGS. 7 and 8, the circumferential lip 30 extends outwardly from the bottom portion of the domed top portion 26 of the base 16.

The amount of air captured by the base 16 can affect the stability of the fully-assembled decoy 10 when resting on a body of water 17. Thus, adjusting the height of the domed top portion 26 of the base 16, which is shown, for example, in FIGS. 7 and 10, permits the user to control the amount of air pumped into the decoy body 12 and trapped in the interior of the base 16 itself. In a preferred embodiment that is not shown in the drawings, the base 16 does not have a domed top portion 26. Rather, the base 16 has a flat top surface above the circumferential lip 30. In a further preferred embodiment of the base 16, which is also not shown in the drawings, the top portion of the base 16 (i.e., the portion above the circumferential lip 30) is actually concave or dished downwardly toward the bottom or open end of the base 16 rather than being domed up or flat. This latter design facilitates quick removal of any water that might get inside of the decoy body 12 during use of the fully-assembled decoy 10. The dished out shape of the top of the base 16 permits the water to easily flow out of the hole 32 in the base 16 and thereby exit the decoy body 12.

Figures 12, 13, 14:
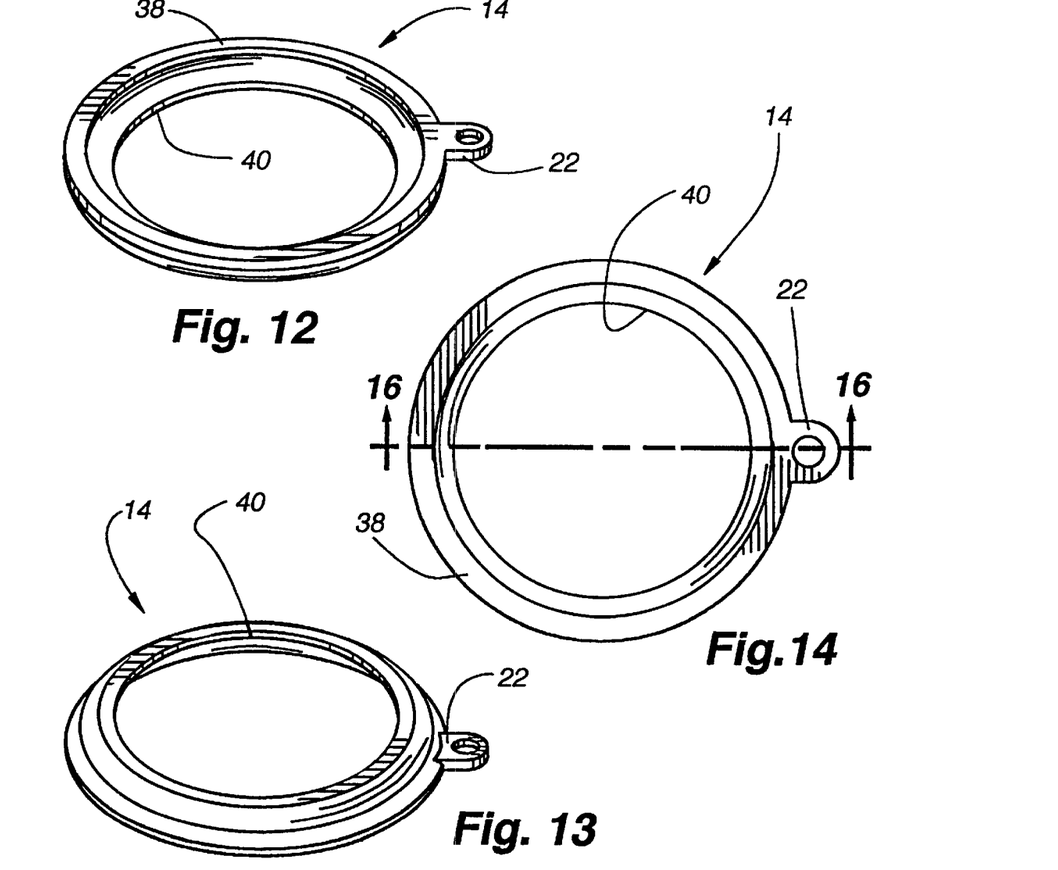
FIG. 12 is an isometric view of a top side of a snap ring comprising part of the first preferred embodiment of the air-capture-and-retention system of the present invention.
FIG. 13 is an isometric view of the bottom of the snap ring depicted in FIG. 12.
FIG. 14 is a top plan view of the snap ring depicted in FIGS. 12 and 13.
Figure 15:
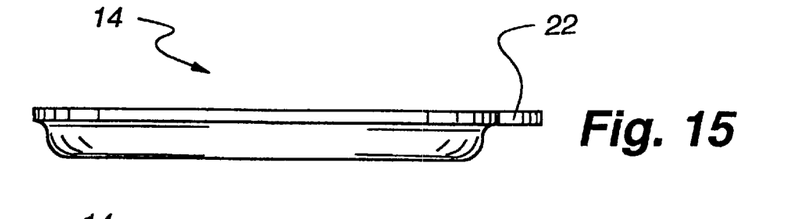
FIG. 15 is an elevational view of the snap ring depicted in FIGS. 12 and 13.
Figure 16:
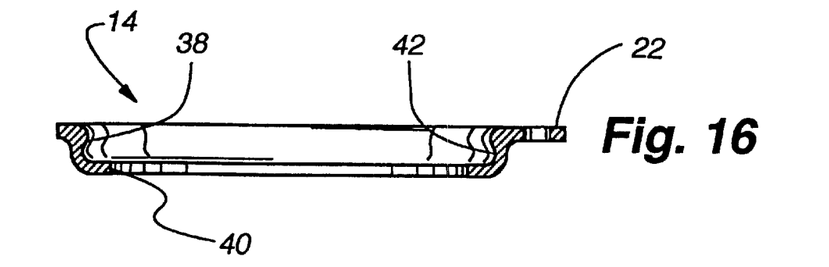
FIG. 16 is a cross-sectional view of the snap ring depicted in FIGS. 12 and 13 taken along line 16—16 of FIG. 14.

Referring next to FIGS. 12–16, details concerning the snap ring 14 are described next. FIG. 12 is an isometric view looking downwardly on the snap ring 14. As shown in FIG. 12, the snap ring 14 includes an overhung upper ring 38. The tie-off loop 22 extends outwardly from the overhung upper ring 38. The tie-off loop 22 may be used to facilitate removal of the snap ring 14 from the mold after it is formed. Also, once the snap ring 14 is in place over the base 16, thereby entrapping a portion of the decoy body 12 and creating a watertight seal as described below, the tie-off loop 22 may be used to detach the snap ring 14 from the base 16 if one desires to take the fully-assembled decoy 10 apart. A bottom opening 40 through the snap ring 14 is dimensioned to slip over the cylindrical bottom portion 28 of the base 16 (FIG. 10), as discussed further below in connection with FIGS. 17–19. As shown to best advantage in FIG. 16, which is a cross-sectional view taken along line 16—16 of FIG. 14, the overhung upper ring 38 defines a retention groove 42 between it and the portion of the snap ring defining the bottom opening 40. The circumferential lip 30 of the base 16 is designed to fit snugly within the retention groove 42.

Figure 17:
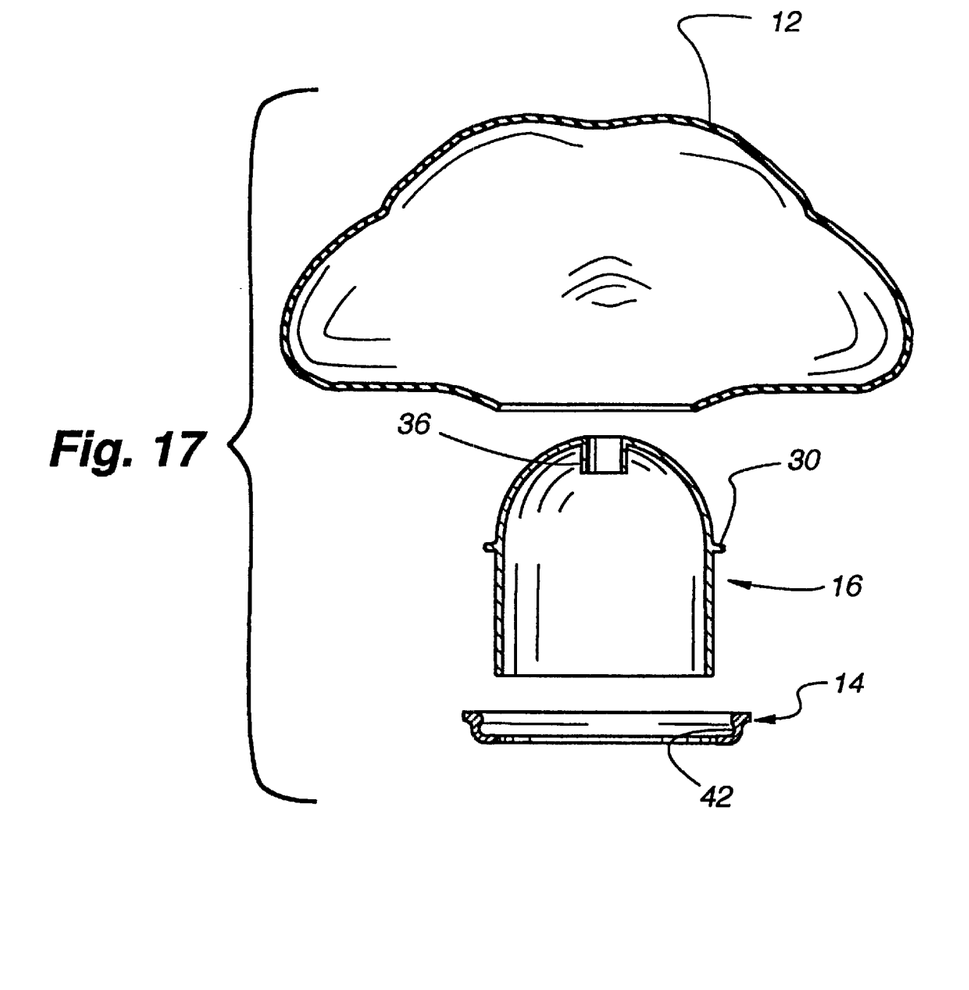
FIG. 17 is an exploded, cross-sectional view taken in the plane of line 19—19 of FIG. 4 and depicting the decoy body, base, and snap ring positioned for assembly.
Figure 18:
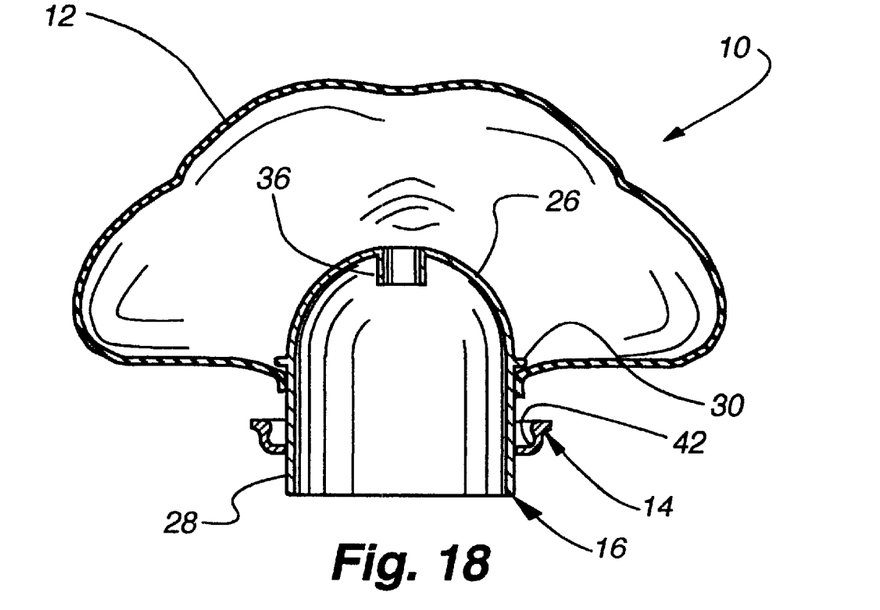
FIG. 18 is similar to FIG. 17, but depicts the decoy body, base, and snap ring at an intermediate stage of assembly.
Figure 19:
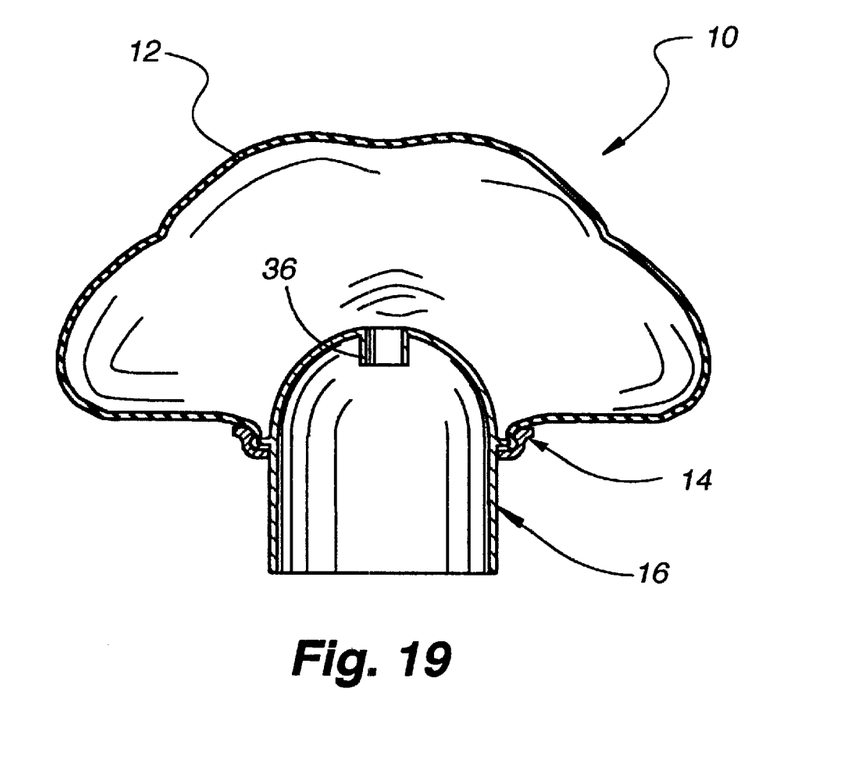
FIG. 19 is a cross-sectional view along line 19—19 of FIG. 4, depicting the fully-assembled decoy body, base, and snap ring.

Referring next to FIGS. 17–19, assembly of the decoy body 12 with the air-capture-and-retention system according to the first preferred embodiment is described next. FIG. 17 is an exploded, cross-sectional view taken in the plane of line 19—19 of FIG. 4, and depicts the decoy body 12, base 16, and snap ring 14 positioned for assembly. FIG. 18 shows an intermediate stage in the assembly of the air-capture-and-retention system of the present invention with the decoy body 12 of the present invention. As shown to best advantage in FIG. 18, assembly continues by pushing the base 16 into the opening 24 (FIG. 6) in the bottom surface of the decoy body 12 until the circumferential lip 30 passes into the interior portion of the decoy body 12. Since the opening 24 in the bottom of the decoy body 12 is dimensioned to snugly fit around the cylindrical bottom portion 28 of the base 16, as shown in FIG. 18, a portion of the decoy body 12 rides against the outer surface of the cylindrical bottom portion 28 of the base 16 once the base 16 has been inserted partially into the opening 24 in the decoy body 12. As previously discussed in connection with FIGS. 12–16, the bottom opening 40 in the snap ring 14 is dimensioned to slip onto the cylindrical bottom portion 28 of the base 16 as also shown in FIG. 18. In FIG. 19, assembly is complete, and the snap ring 14 has been pushed upwardly until the portion of the decoy body 12 adjacent to the opening 24 in the bottom of the decoy body 12 has been releasably trapped between the circumferential lip 30 and the retention groove 42 of the snap ring 14, creating a water-tight seal between the air-capture-and-retention system and the decoy body 12.

Figure 20:
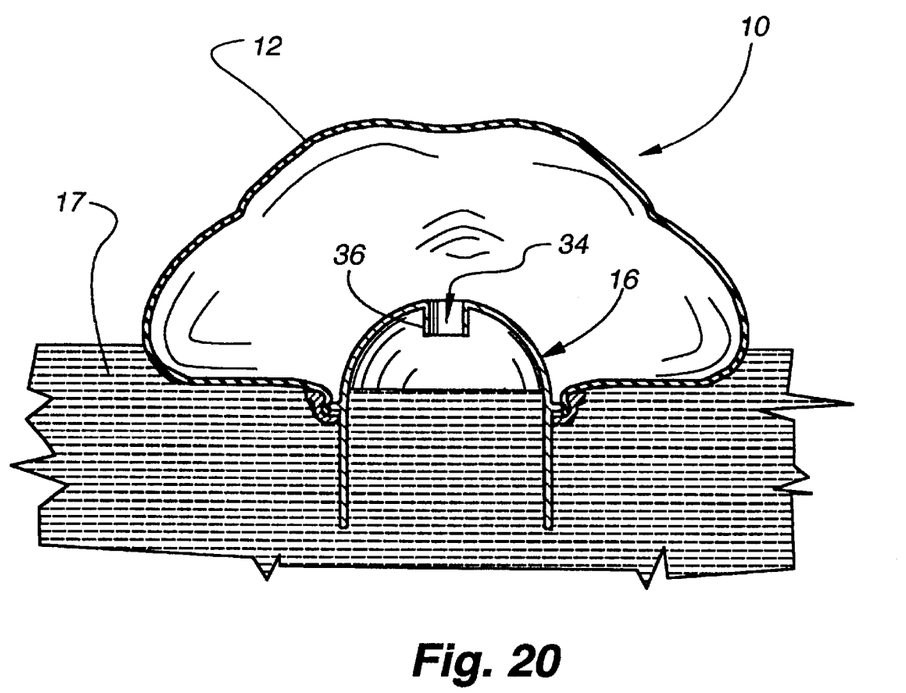
FIG. 20 is similar to FIG. 19, but depicts the fully-assembled decoy floating on the body of water.

FIG. 20 depicts the fully-assembled decoy 10 of FIG. 19 on water 17. The air-capture-and-retention system of the present invention is designed to keep a slightly pressurized amount of air in the decoy body 12 so that the decoy body 12 remains inflated. The downward displacement of the water 17 in the cylindrical bottom portion 28 of the base 16 is exaggerated in FIG. 20, but illustrates that the air pressure within the decoy body 12 may be slightly greater than the atmospheric pressure pressing downwardly on the external surface of the water 17. Since the cylindrical bottom portion 28 of the base 16 extends below the bottom surface of the decoy body 12, it also helps to stabilize the fully-assembled decoy 10 on the surface of the water 17.

Figure 21:
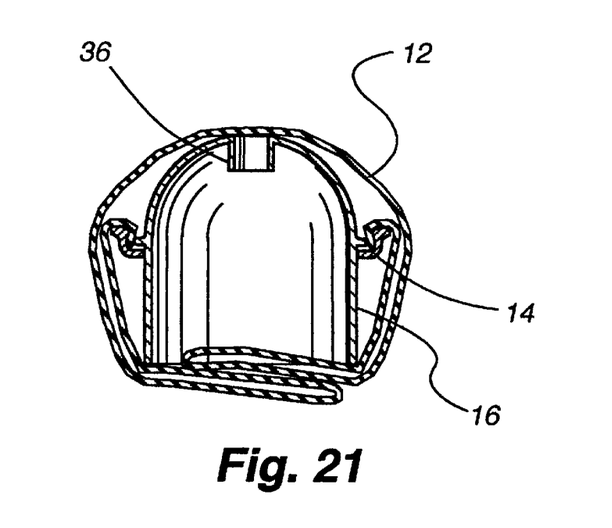
FIG. 21 is a cross-sectional view similar to FIG. 19, but showing the decoy body collapsed around the base and snap ring for easy transportation or storage.

FIG. 21 is a schematic, cross-sectional view most similar to FIG. 19, but shows the decoy body 12 in a collapsed condition. Since the decoy body 12 of the present invention is preferably made from a flexible material, it is possible to collapse the decoy body 12 around the air-capture-and-retention system as shown in FIG. 21 to facilitate easy storage and transport of fully-assembled decoys 10.

FIGS. 22–26 depict a second preferred embodiment for the air-capture-and-retention system of the present invention. The decoy body 12 used in combination with the second preferred embodiment of the air-capture-and-retention system may be substantially the same as the decoy body 12 used in conjunction with the first embodiment of the air-capture-and-retention system shown in FIGS. 1–21. The size of the opening 24 (FIG. 6) in the bottom surface of the decoy body 12 may, however, need adjustment.

Figure 22:
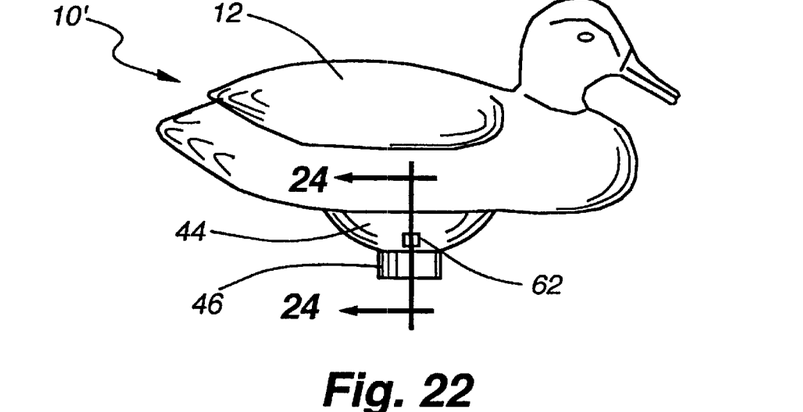
FIG. 22 is an elevational view similar to FIG. 4, but showing a fully-assembled decoy including an air-capture-and-retention system according to a second preferred embodiment of the present invention.
Figure 23:
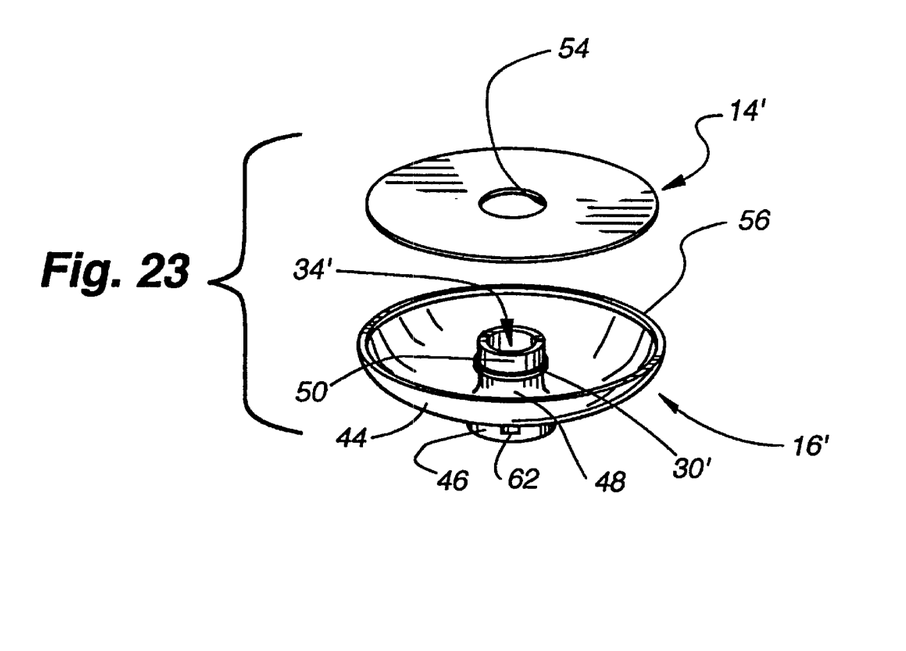
FIG. 23 is an exploded, isometric view of the air-capture-and-retention system according to the second embodiment of the present invention.
Figure 24:
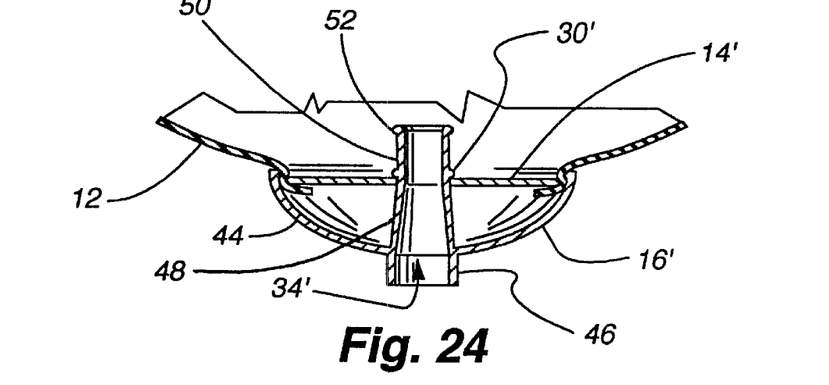
FIG. 24 is a fragmentary cross-sectional view taken along line 24—24 of FIG. 22.

Referring most specifically to FIGS. 23 and 24, the second preferred embodiment of the air-capture-and-retention system is described next. FIG. 24 is a fragmentary, cross-sectional view along line 24—24 of FIG. 22. The alternative base 16' includes a bowl-shaped portion 44. A lower cylindrical section 46 is integrally formed at a low point on the exterior surface of the bowl-shaped portion 44 and extends downwardly. An intermediate, frusto-conical section 48 extends upwardly from an inner, lower surface of the bowl-shaped portion 44 of the alternative base 16'. As shown to best advantage in FIG. 24, an upper end of the lower cylindrical section 46 aligns with the lower end of the intermediate, frusto-conical section 48. At the top of the frusto-conical section 48 is a circumferential lip 30', which is similar to the circumferential lip 30 depicted in, for example, FIGS. 10 and 11. Extending from above this circumferential lip 30' is an optional upper cylindrical section 50. Finally, a circumferential shipping ring 52 (shown in FIG. 24 but not in FIG. 23) is formed at the upper end of the optional upper cylindrical section 50. The purpose of the optional upper cylindrical section 50, including the circumferential shipping ring 52 comprising part thereof, is described further below. An air port 34' is defined through the center of the lower cylindrical section 46, the frusto-conical section 48, and the optional upper cylindrical section 50.

Continuing to refer primarily to FIG. 23, the alternative snap ring 14', comprising part of the second preferred embodiment of the air-capture-and-retention system, is clearly depicted. Similar to the function performed by the snap ring 14 of the first preferred embodiment of the air-capture-and-retention system, this alternative snap ring 14' cooperates with the alternative base 16' to trap a portion of the decoy body 12, thereby securing the second preferred embodiment of the air-capture-and-retention system to the decoy body 12. The alternative snap ring 14' includes a mounting hole 54 (FIG. 23) that, as shown to best advantage in FIG. 24, snaps past the circumferential lip 30' at the upper end of the frusto-conical section 48 to facilitate entrapment of a portion of the decoy body 12 between the alternative snap ring 14' and the alternative base 16'.

To assemble the second embodiment of the air-capture-and-retention system with the decoy body 12, the alternative snap ring 14' is first placed within the decoy body 12 and positioned above the opening 24 (FIG. 6) in the bottom surface of the decoy body 12 as shown in FIG. 24. The alternative base 16' is then snapped onto the alternative snap ring 14'. To complete this connection, the alternative base 16' is forced upwardly, causing the mounting hole 54 of the alternative snap ring 14' to move downwardly on the optional upper cylindrical section 50 relative to the circumferential lip 30'. Upon sufficient advancement of the alternative base 16' upwardly relative to the alternative snap ring 14', the circumferential lip 30' eventually snaps through the mounting hole 54. As this occurs, the outer circumferential edge of the alternative snap ring 14' snaps past a retention lip 56 (FIG. 23) formed along the perimeter of the upper edge of the alternative base 16'. The alternative snap ring 14' is prevented from sliding too far downwardly on the frusto-conical section 48 by the cross-sectional diameter of the frusto-conical section 48. In particular, the outside diameter of the frusto-conical section 48 immediately below the circumferential lip 30' is approximately the same as the diameter of the mounting hole 54. As shown in FIG. 24, a portion of the decoy body 12 is trapped between the outer perimeter of the alternative snap ring 14' and the retention lip 56 around the upper edge of the alternative base 16'.

As mentioned above, the alternative base 16' may include an optional upper cylindrical section 50 having the circumferential shipping ring 52 formed around the upper edge thereof. If one desires to ship an alternative snap ring 14' and alternative base 16' combination that has not yet been assembled with a decoy body 12, the circumferential shipping ring 52 and optional upper cylindrical section 50 may be used. For example, if the mounting hole 54 of the alternative snap ring 14' is forced over the circumferential shipping ring 52, the mounting hole 54 will then ride on the external surface of the optional upper cylindrical section 50 between the circumferential shipping ring 52 and the circumferential lip 30'. Then, when it is time to assemble the second alternative air-capture-and-retention system with a decoy body 12, the alternative snap ring 14' is again placed within the opening 24 in the bottom surface of the decoy body 12, and the alternative base 16' is again forced upward until the circumferential lip 30' snaps through the mounting hole 54 in the alternative snap ring 14'.

Figures 25, 26:
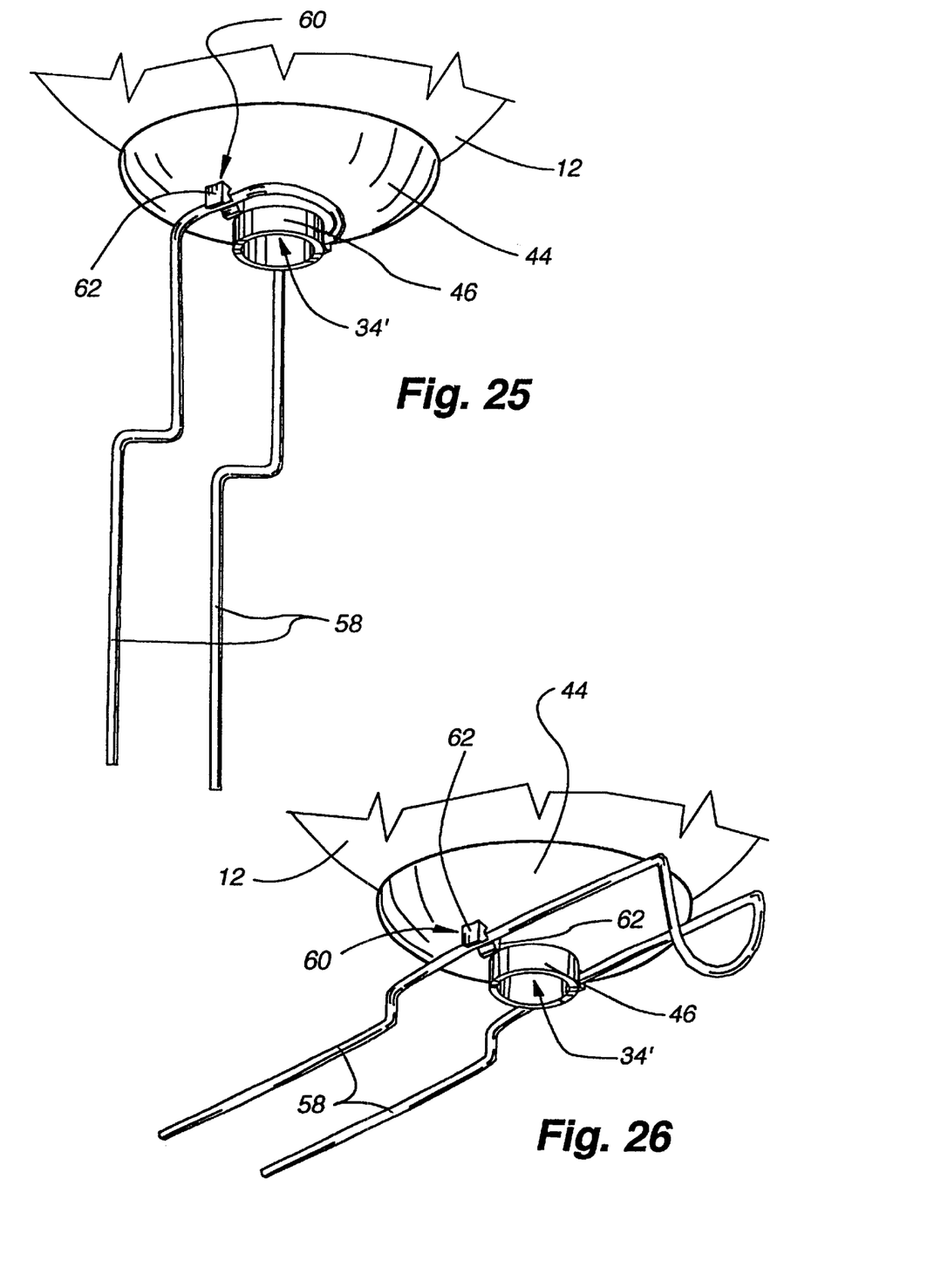
FIG. 25 is a fragmentary, isometric view looking upwardly at the fully-assembled decoy depicted in FIG. 22 and further including an optional set of folding legs in an extended configuration.
FIG. 26 is a fragmentary, isometric view similar to FIG. 25, but showing the set of folding legs in a retracted configuration.

As shown to best advantage in FIGS. 25 and 26, folding legs 58 may optionally be used in connection with the fully-assembled decoy depicted in, for example, either FIG. 1 (10) or FIG. 22 (10'). A pair of leg mounts 60, each leg mount 60 comprising two flexible arms 62 in the preferred embodiment (see FIGS. 22, 23, 25, and 26), is attached to or molded into the base 16 or the alternative base 16'. As is shown to best advantage in FIGS. 25 and 26, a portion of the folding legs 58 may be snapped into position between the two flexible arms 62. FIG. 25 depicts the folding legs 58 in an extended configuration. In this configuration, the fully-assembled decoy 10, 10' could be placed securely in a shallow water body, obviating the need for a placement weight 18 such as the one depicted in FIG. 1. Alternatively, with the folding legs 58 in the extended configuration depicted in FIG. 25, the fully-assembled decoy 10, 10' may be placed in an open field by driving or pressing the folding legs 58 into the ground. When the folding legs 58 are in the retracted configuration shown in FIG. 26, the fully-assembled decoy 10, 10' may be placed either on water 17 or on the ground. It should be noted that the fully-assembled decoys depicted in, for example, FIGS. 1 (10) and 22 (10'), could be placed on the ground without the folding legs 58. If one desires to use a decoy according to the present invention on the ground without also using folding legs 58, the first embodiment of the air-capture-and-retention system (shown in, for example, FIGS. 1 and 4) works better than the second embodiment of the air-capture-and-retention system. Also, depending upon the rigidity of the decoy body 12, it may be necessary to seal the air port 34, 34' after inflating the decoy body 12 if the fully-assembled decoy 10, 10' is placed in a field rather than on the surface of a lake, pond, or stream. This could be accomplished, for example, by placing a cork (not shown) in the air port 34, 34'. Using a cork to seal the air port 34, 34' when the decoy 10, 10' is resting on a body of water would prevent any water from entering the decoy body 12.

Although several embodiments of this invention have been described above, those skilled in the art could make numerous alterations to the disclosed embodiments without departing from the spirit or scope of this invention. For example, the decoy body 12 shown in the drawings, which most closely resemble a duck, could be formed in the shape of numerous different animals. Also, as alluded to in the discussion above, the specific configuration of the top portion 26 of the base 16 could be adjusted depending upon the size of the decoy 10, the firmness desired in the resulting inflated configuration, the roughness of the water 17 upon which the decoy 10 is placed, the amount and placement of the positioning weight 18 attached to the decoy 10 for stabilization, and other factors. An important feature of this invention is that the decoy body 12 is attached to the air-capture-and-retention system that facilitates easy inflation and deflation of the decoy 10, 10', yet facilitates a lifelike decoy during use. All directional references (e.g., upper, lower, upward, downward, left, right, leftward, rightward, top, bottom, above, below, vertical, horizontal, clockwise and counterclockwise) are used only for identification purposes to aid the reader's understanding of the present invention, and do not create limitations, particularly as to the position, orientation, or use of the invention. It is intended that all matter contained in the above description or shown in the accompanying drawings shall be interpreted as illustrative only and not limiting.

I claim:

1. A collapsible game decoy comprising
   a decoy body, wherein said decoy body includes a bottom wall having an opening therein; and
   an air-capture-and-retention system, wherein said air-capture-and-retention system comprises
      a base, wherein said base includes a top portion and a bottom portion, and wherein a lip divides said top portion from said bottom portion; and
      a snap member, wherein a portion of said decoy body adjacent to said opening in said bottom wall is snappingly retained between said lip and said snap member when said snap member and said base are snappingly attached to said decoy body.

2. A collapsible game decoy comprising
   a decoy body, wherein said decoy body includes a bottom wall having an opening therein; and
   an air-capture-and-retention system, wherein said air-capture-and-retention system comprises
      a base, wherein said base includes a domed top portion and a cylindrical bottom portion, and wherein a circumferential lip divides said domed top portion from said cylindrical bottom portion; and
      a snap ring, wherein a portion of said decoy body adjacent to said opening in said bottom wall is snappingly retained between said circumferential lip and said snap ring when said snap ring and said base are snappingly attached to said decoy body.

3. The collapsible game decoy of claim 2, wherein said snap ring further comprises a retention groove, and wherein said portion of said decoy body adjacent to said opening in said bottom wall is snappingly retained between said circumferential lip and said retention groove of said snap ring.

4. The collapsible game decoy of claim 2, wherein said snap ring further comprises an overhung upper ring and a bottom opening having a diameter that slippingly accommodates said cylindrical bottom portion of said base, and wherein said retention groove is defined between said overhung upper ring and said bottom opening.

5. A collapsible game decoy comprising
   a decoy body, wherein said decoy body includes a bottom wall having an opening therein; and
   an air-capture-and-retention system, wherein said air-capture-and-retention system comprises a base and a snap ring, wherein said base includes a domed top portion and a cylindrical bottom portion, and wherein a circumferential lip divides said domed top portion from said cylindrical bottom portion, and further wherein a portion of said decoy body adjacent to said opening is snappingly entrapped between said snap ring and said circumferential lip.

6. A collapsible game decoy comprising
   a decoy body, wherein said decoy body includes a bottom wall having an opening therein; and
   an air-capture-and-retention system, wherein said air-capture-and-retention system comprises
      a base, wherein said base includes a domed top portion and a cylindrical bottom portion, wherein a circumferential lip divides said domed top portion from said cylindrical bottom portion, and wherein said domed top portion has an air port communicating therethrough; and
      a snap ring, wherein said snap ring and said base are snappingly attached to said decoy body.

7. The collapsible game decoy of claim 6, wherein said air port passes though a small cylindrical sleeve.

8. A collapsible game decoy comprising
   a decoy body; and
   an air-capture-and-retention system comprising a base and a snap ring,
      wherein said base further comprises a cylindrical bottom portion, and
      wherein said snap ring further comprises
         an inwardly overhung upper ring,
         a lower portion having a bottom opening therethrough, said bottom opening being dimensioned to slip over said cylindrical bottom portion of said base, and
         a retention groove defined on an inner surface of said snap ring between said inwardly overhung upper ring and said lower portion of said snap ring, and
      further wherein said snap ring and said base snappingly capture a portion of said decoy body therebetween.

9. The collapsible game decoy of claim 8, wherein said snap ring further comprises a tie-off loop adapted to have a placement weight attached thereto by a cord.

10. A game decoy comprising
    a collapsible decoy body having a bottom wall with an opening therethrough; and
    an air-capture-and-retention system comprising a base and a snap ring; wherein said base includes a domed top portion, a cylindrical bottom portion, and a radiallyoutwardly extending circumferential lip dividing said domed top portion from said cylindrical bottom portion; wherein said snap ring includes an overhung upper ring, a lower portion having a bottom opening therethrough dimensioned to slip over said cylindrical bottom portion of said base, and a retention groove defined between said overhung upper ring and said lower portion; and wherein a portion of said decoy body adjacent to said opening through said bottom wall is releasably trapped between said circumferential lip and said retention groove, creating a seal between said air-capture-and-retention system and said decoy body; wherein said opening through said bottom wall of said decoy body is dimensioned to snugly fit around said cylindrical bottom portion of said base and wherein said circumferential lip rests against an inner surface of said decoy body adjacent said opening through said bottom wall of said decoy body.

11. The game decoy of claim 10, wherein said snap further comprises a tie-off loop adapted to have a placement weight attached thereto by a cord.

12. The game decoy of claim 10, wherein said decoy body comprises a flexible, air-tight material.

13. The game decoy of claim 10, wherein said base and said snap ring comprise a rigid material.

* * * * *